(12) United States Patent
Horii et al.

(10) Patent No.: US 11,422,552 B2
(45) Date of Patent: Aug. 23, 2022

(54) DRIVING-MODE SWITCH CONTROL SYSTEM, DRIVING-MODE SWITCH CONTROL PROGRAM PRODUCT, AND DRIVING-MODE SWITCH CONTROL METHOD

(71) Applicant: DENSO CORPORATION, Kariya (JP)

(72) Inventors: Soshi Horii, Kariya (JP); Ichiro Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 335 days.

(21) Appl. No.: 16/583,059

(22) Filed: Sep. 25, 2019

(65) Prior Publication Data

US 2020/0019163 A1 Jan. 16, 2020

Related U.S. Application Data

(63) Continuation of application No. PCT/JP2018/008207, filed on Mar. 5, 2018.

(30) Foreign Application Priority Data

Apr. 5, 2017 (JP) .............................. JP2017-075415

(51) Int. Cl.
*G05D 1/00* (2006.01)
*B60W 10/18* (2012.01)
(Continued)

(52) U.S. Cl.
CPC ........... *G05D 1/0061* (2013.01); *B60W 10/18* (2013.01); *B60W 10/20* (2013.01); *B60W 40/08* (2013.01);
(Continued)

(58) Field of Classification Search
CPC ........ G05D 1/0061; G05D 2201/0213; B60W 10/18; B60W 10/20; B60W 40/08;
(Continued)

(56) References Cited

U.S. PATENT DOCUMENTS

2004/0260440 A1 12/2004 Fujita et al.
2012/0212353 A1* 8/2012 Fung ..................... B60W 30/02
340/905

(Continued)

FOREIGN PATENT DOCUMENTS

EP 2717113 A1 4/2014
EP 3330148 A1 6/2018
(Continued)

*Primary Examiner* — James J Lee
*Assistant Examiner* — Shon G Foley
(74) *Attorney, Agent, or Firm* — Harness, Dickey & Pierce, P.L.C.

(57) ABSTRACT

A driving-mode switch control system determines whether an arousal level of a driver of a vehicle is a level at which a manual driving is possible, acquires, as operation amount information, an operation amount that is input by the driver into an operation device, sets an operation guide amount to be input into the operation device with respect to the driver determined to have the arousal level at which the manual driving is possible, and determines whether to permit a switching from an automatic driving to the manual driving based on a comparison between the operation amount acquired as the operation amount information and the operation guide amount.

19 Claims, 10 Drawing Sheets

(51) Int. Cl.
*B60W 10/20* (2006.01)
*B60W 40/08* (2012.01)
*B60W 50/08* (2020.01)
*G06V 20/59* (2022.01)

(52) U.S. Cl.
CPC ......... *B60W 50/082* (2013.01); *G06V 20/597* (2022.01); *B60K 2370/175* (2019.05); *G05D 2201/0213* (2013.01)

(58) Field of Classification Search
CPC ........... B60W 50/082; B60W 60/0053; B60W 2040/0827; B60W 40/09; G06K 9/00845; B60K 2370/175; G08B 21/06; G08G 1/16
See application file for complete search history.

(56) References Cited

U.S. PATENT DOCUMENTS

| | | | |
|---|---|---|---|
| 2016/0246298 A1 | 8/2016 | Sato et al. | |
| 2017/0212525 A1* | 7/2017 | Wang | G01C 21/3484 |
| 2017/0364070 A1* | 12/2017 | Oba | B60W 60/0051 |
| 2017/0368936 A1* | 12/2017 | Kojima | B60W 40/09 |
| 2018/0113454 A1 | 4/2018 | Emura et al. | |

FOREIGN PATENT DOCUMENTS

| | | |
|---|---|---|
| JP | 2004344613 A | 12/2004 |
| JP | 2007196809 A | 8/2007 |
| JP | 2009125276 A | 6/2009 |
| JP | 2012252515 A | 12/2012 |
| JP | 2015185085 A | 10/2015 |
| JP | 2016115356 A | 6/2016 |
| JP | 2016153960 A | 8/2016 |
| JP | 2017030390 A | 2/2017 |
| WO | WO-2016/199379 A1 | 12/2016 |

* cited by examiner

DRIVING-MODE SWITCH CONTROL SYSTEM, DRIVING-MODE SWITCH CONTROL PROGRAM PRODUCT, AND DRIVING-MODE SWITCH CONTROL METHOD

CROSS REFERENCE TO RELATED APPLICATIONS

The present application is a continuation application of International Patent Application No. PCT/JP2018/008207 filed on Mar. 5, 2018, which designated the U.S. and claims the benefit of priority from Japanese Patent Application No. 2017-75415 filed on Apr. 5, 2017. The entire disclosures of all of the above applications are incorporated herein by reference.

TECHNICAL FIELD

The present disclosure relates to a driving-mode switch control system, a driving-mode switch control program product, and a driving-mode switch control method.

BACKGROUND

There is known a technique for determining whether a driver can appropriately perform a driving operation before a driving mode is switched from an automatic driving to a manual driving.

SUMMARY

The present disclosure provides a driving-mode switch control system, a driving-mode switch control program product, or a driving-mode switch control method in which it is determined whether an arousal level of a driver of a vehicle is a level at which a manual driving is possible, an operation amount that is input by the driver into an operation device is acquired as operation amount information, an operation guide amount to be input into the operation device is set with respect to the driver determined to have the arousal level at which the manual driving is possible, and it is determined whether to permit a switching from an automatic driving to the manual driving based on a comparison between the operation amount acquired as the operation amount information and the operation guide amount.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
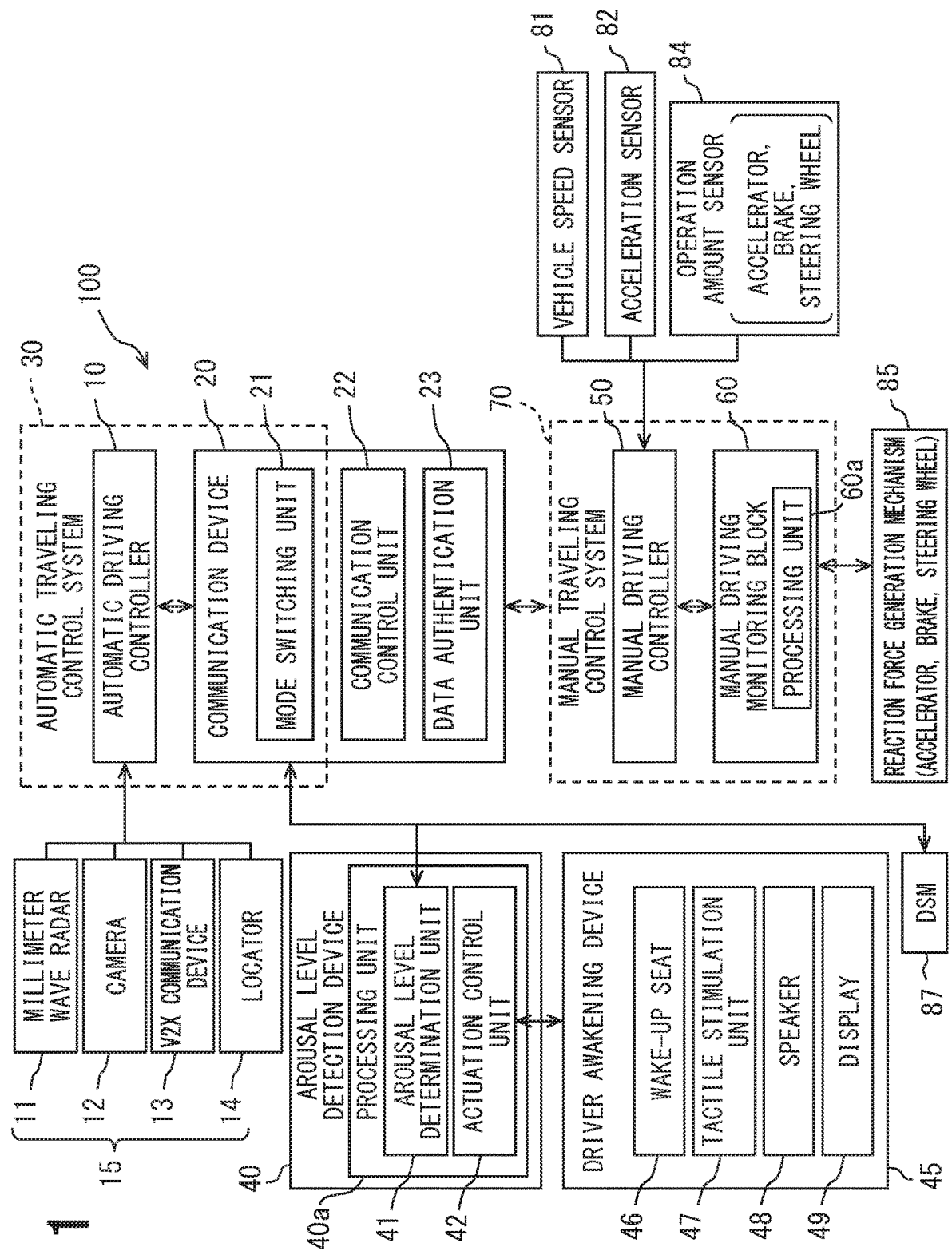
FIG. 1 is a block diagram showing an overview of an in-vehicle system according to a first embodiment of the present disclosure.

There is an automatic driving controller that requests a driver to perform a simulated driving operation when switching a driving mode from an automatic driving to a manual driving. Specifically, the automatic driving controller indicates an operation amount to be input into a steering wheel to the driver with a steering indicator. When the driver can input such an appropriate driving operation as to correspond with a mark position of the steering indicator, the automatic driving controller permits a cancellation of the automatic driving.

During a period when a vehicle is automatically driven by an automatic driving function, an arousal level of the driver tends to fall. However, in the above-described automatic driving controller, there is a possibility that even a driver with a low arousal level is requested to perform the simulated driving operation for recovering a sense of driving. In such a case, the driver with the low arousal level cannot easily recover the sense of driving even when performing the simulated driving operation. As a result, a state in which the driving mode cannot be switched to the manual driving by the driver could last long.

According to an aspect of the present disclosure, a driving-mode switch control system includes a manual driving device, an automatic driving device, an operation information acquisition unit, an arousal level determination unit, and a switch determination unit. The manual driving device is configured to perform a manual driving of a vehicle in which a behavior of the vehicle is controlled based on a driving operation input by a driver into an operation device. The automatic driving device is configured to perform an automatic driving of the vehicle on behalf of the driver. The operation information acquisition unit is configured to acquire, as operation amount information, an operation amount that is input by the driver into the operation device. The arousal level determination unit is configured to determine whether an arousal level of the driver is a level at which the manual driving is possible. The switch determination unit is configured to set an operation guide amount to be input into the operation device with respect to the driver determined by the arousal level determination unit to have the arousal level at which the manual driving is possible, and determine whether to permit a switching from the automatic driving to the manual driving, based on a comparison between the operation amount acquired as the operation amount information and the operation guide amount.

According to another aspect of the present disclosure, a driving-mode switch control method is a method for controlling a switching from an automatic driving to a manual driving of a vehicle mounted with a manual driving device that performs the manual driving of the vehicle in which a behavior of the vehicle is controlled based on a driving operation input by a driver into an operation device and an automatic driving device that performs the automatic driving of the vehicle on behalf of the driver. The driving-mode switching control method includes determining whether an arousal level of the driver is a level at which the manual driving is possible, acquiring, as operation amount information, an operation amount that is input by the driver into the operation device, setting an operation guide amount to be input into the operation device with respect to the driver determined to have the arousal level at which the manual driving is possible, and determining whether to permit the switching from the automatic driving to the manual driving based on a comparison between the operation amount acquired as the operation amount information and the operation guide amount.

In these aspects, after the confirmation that the arousal level of the driver is the level at which the driving is possible, it is determined whether to permit the switching from the automatic driving to the manual driving. When the arousal level of the driver is determined before a recovery of a sense of driving is confirmed as described above, since the driver performs the driving operation in an awake state, the driver can easily recover the sense of driving through the input of the driving operation into the operation device. As a result, the switching from the automatic driving to the manual driving is also easy to be permitted, and it is possible to smoothly perform a driving-mode switch from an automatic driving function to the driver.

A plurality of embodiments of the present disclosure will be described below with reference to the drawings. A corresponding component in each of the embodiments is assigned with the same reference numeral, so that a redundant description may be omitted. When only a part of a configuration is described in an embodiment, a configuration of another embodiment described previously can be applied to the other parts of the configuration. It is possible not only to combine the configurations explicitly described in the respective embodiments, but also to partially combine configurations of a plurality of embodiments, even if not explicitly described, so long as there is no problem in the combination. Combinations of the configurations described in a plurality of embodiments and modifications, which are not explicitly described, are also taken as disclosed by the following description.

First Embodiment

An in-vehicle system 100 according to a first embodiment of the present disclosure shown in FIG. 1 is mounted in a vehicle and controls a behavior of the vehicle. The in-vehicle system 100 causes the vehicle to automatically travel by an automatic traveling control system 30. The in-vehicle system controls a driving-mode switch between a driver on board and an automatic driving function of the automatic traveling control system 30. The in-vehicle system 100 includes an automatic driving controller 10, a communication device 20, an arousal level detection device 40, a manual driving controller 50, and a manual driving monitoring block 60 shown in FIGS. 1 and 2.

The automatic driving controller 10 mainly includes a computer having a processing unit that includes at least one processor, a RAM, and a memory device. The automatic driving controller 10 is connected to an advanced driver assistance system (ADAS system) 15. The ADAS system 15 includes a millimeter wave radar 11, a camera 12, a V2X communication device 13, and a locator 14. The automatic driving controller 10 acquires ADAS data, a road map, road surface information, and current position information from the ADAS system 15. The ADAS data includes, for example, position information and speed information of other vehicles and pedestrians on the periphery, and gradient information of roads. The automatic driving controller 10 causes the vehicle to travel autonomously and automatically while integrating the acquired plurality of pieces of information and adapting the traveling state of the vehicle to the situation on behalf of the driver.

The communication device 20 controls the exchange of information between the automatic driving controller 10 and the manual driving controller 50. In addition, the communication device 20 can also communicate with the arousal level detection device 40. The communication device 20 functions as the automatic traveling control system 30 in cooperation with the automatic driving controller 10. The communication device 20 is provided with a mode switching unit 21, a communication control unit 22, and a data authentication unit 23.

The mode switching unit 21 controls a switching from an automatic driving mode to a manual driving mode and a switching from the manual driving mode to the automatic driving mode. In addition, the mode switching unit 21 temporarily limits the actuation of the automatic driving by the automatic driving controller 10 in the driving-mode switch from the automatic driving function to the driver, and takes this mode as a semi-automatic driving mode in which a driving operation by the driver is reflected in the vehicle behavior. At this time, the automatic driving function by the automatic driving controller 10 is partly operated, so that the driver can receive the driving support by the automatic driving controller 10.

The communication control unit 22 controls mutual information exchange among the automatic driving controller 10, the arousal level detection device 40, and the manual driving monitoring block 60. The data authentication unit 23 performs an authentication process for data received from the arousal level detection device 40, namely, a process for confirming the validity. The switching from the automatic driving mode to the manual driving mode is possible based on that the data authentication unit 23 confirms the validity of the authentication data acquired from the arousal level detection device 40.

The automatic traveling control system 30 is provided with an operation amount setting unit 31. The operation amount setting unit 31 is a functional block built in the automatic driving controller 10 or the communication device 20. The operation amount setting unit 31 individually sets operation guide amounts of a steering wheel, an accelerator pedal, and a brake pedal, and provides the operation guide amounts to a manual traveling control system 70. The operation guide amounts are values used for determining (feedback test) the degree of recovery of the sense of driving as described later and are values defining the operation amounts to be input into the operation device.

The operation amount setting unit 31 can identify the driver by using the information of a driver status monitor (DSM) 87 and can set an operation guide amount suitable for the driving characteristics of each driver. More specifically, the operation amount setting unit 31 learns a normal pedal operation for each driver during a period in which the driver is manually driving. Based on the information acquired from the ADAS system 15, the operation amount setting unit 31 grasps road situations during traveling. In accordance with the grasped road information, the operation amount setting unit 31 calculates, as an estimated operation amount, an operation amount estimated to be input by the driver during the manual driving on the road being traveled. By adopting the estimated operation amount as the operation guide amount, the operation amount setting unit 31 can define the operation guide amount suitable for the driving characteristics of the driver on board. The operation amount setting unit 31 outputs the defined operation guide amount to the manual driving monitoring block 60.

The arousal level detection device 40 mainly includes a computer having a processing unit 40*a* that includes at least one processor, a RAM, and a memory device. The arousal level detection device 40 is provided with an arousal level determination unit 41 and an actuation control unit 42. The arousal level determination unit 41 and the actuation control unit 42 may be functional blocks constructed by the processing unit 40*a* executing a program or may be dedicated electric circuits provided in the arousal level detection device 40.

The arousal level determination unit 41 determines whether the arousal level of the driver is a level at which the driver can drive. The arousal level of the driver is detected based on a change in an expression of the driver, physical condition data of the driver such as a heart rate, blood pressure, a respiratory rate, and a perspiration degree, the voice of the driver, a response to a call, and a change in brain activity detectable using a brain activity sensor, for example. When the arousal level determination unit 41 determines that the arousal level of the driver is the level at which the driving is possible, a change in the driving mode from the automatic driving mode to the manual driving mode is permitted. In the first embodiment, as an example, the arousal level of the driver is determined based on the measurement result of the DSM 87.

The actuation control unit 42 actuates a driver awakening device 45 when the arousal level determination unit 41 determines that the arousal level of the driver is not a level at which the driving is possible. The actuation control unit 42 recovers the arousal level of the driver by controlling the actuation of the driver awakening device 45. The actuation control unit 42 continues the actuation of the driver awakening device 45 intermittently or continuously until the arousal level determination unit 41 determines that the arousal level of the driver is the level at which the driving is possible.

The driver awakening device 45 includes various devices that are mounted in the vehicle and awaken the driver. When the driver is not awake and the arousal level of the driver does not reach the level at which the manual driving is possible, the driver awakening device 45 gives a stimulus such as sound, light, and scent, and a physical stimulus to a skin of the driver. The physical stimulus on the skin is desirably a stimulus that is felt as unpleasant, and may be a direct stimulus or an indirect stimulus via vibration and movement of the seat, for example. The driver awakening device 45 giving such stimuli includes, for example, a wake-up seat 46, a tactile stimulation unit 47, a speaker 48, and a display 49.

Figure 3:
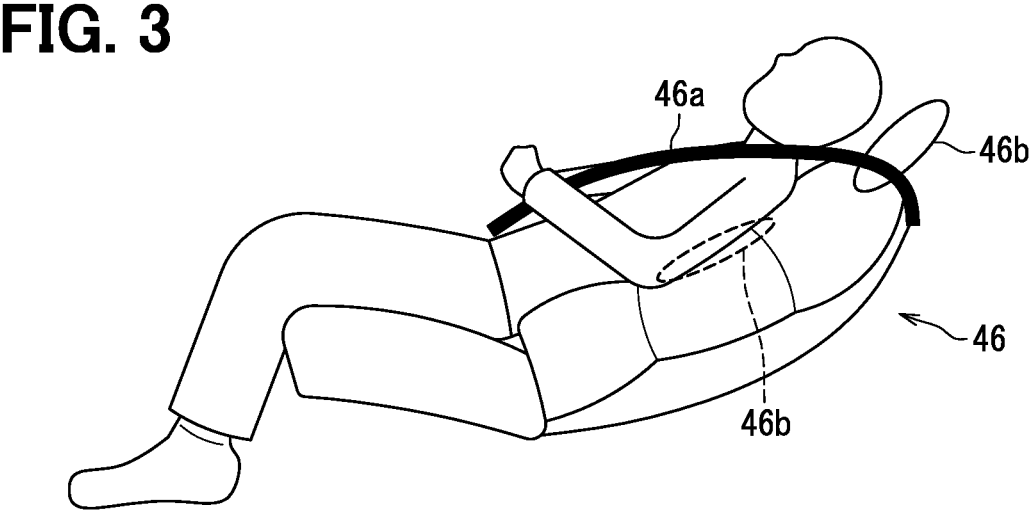
FIG. 3 is a view showing details of a wake-up seat used as a driver awakening device.
Figure 4:
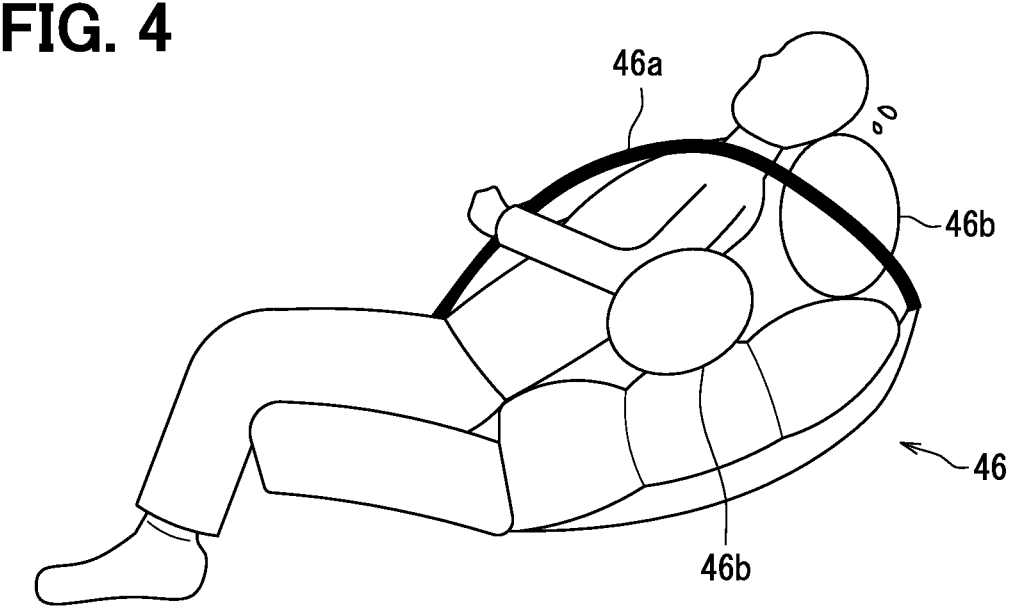
FIG. 4 is a view showing an operation of the wake-up seat.

The wake-up seat 46 is provided in the vehicle as a driver seat. For forcibly awakening the driver within a limited period of the driving-mode switch, the wake-up seat 46 can make an awakening operation to give a feeling of pressure to the skin of the driver, an awakening operation to move the skeleton of the driver to an appropriate amount, and some other motion. As shown in FIGS. 3 and 4, the wake-up seat 46 has a holding belt 46*a* and two inflatable members 46*b*. The holding belt 46*a* holds the upper body of the driver on the backrest of the driver seat.

Figure 5:
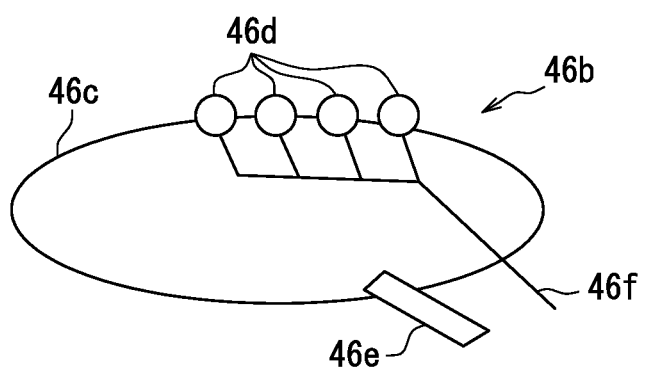
FIG. 5 is a view schematically showing a configuration of an inflatable member used for the wake-up seat.

As shown in FIGS. 3 to 5, each of the inflatable members 46*b* is an airbag disposed in each of the backrest and the headrest of the driver seat. The inflatable members 46*b* can be brought into close contact with the driver in a relaxed state during traveling in the automatic driving mode. Each of the inflatable members 46*b* is made up of a main body 46*c*, and a plurality of protrusions 46*d*, for example. The main body 46*c* and the respective protrusions 46*d* are inflatable and contractible by filling and discharging air, and increase and decrease the strength of the stimulus to the driver. The main body 46*c* is provided with a low-pressure air inlet 46*e*. The inflatable members 46*b* inflate due to the filling of the intake air into the main body 46*c* through the low-pressure air inlet 46*e*. As a result, each of the inflatable members 46*b* can forcibly change the posture of the driver or give a feeling of pressure to the back of the driver.

The plurality of protrusions 46*d* are arranged on the driver-side surface of the main body 46*c*. Each protrusion 46*d* is provided with a high-pressure air inlet 46*f*. The protrusions 46*d* can receive air with higher pressure than the main body 46*c*, and the protrusions 46*d* comes into a harder state than the main body 46*c* due to the filling of the air into the protrusions 46*d* through the high-pressure air inlet 46*f*. By adjusting the size and distribution of the protrusions 46*d*, the protrusions 46*d* can give a pain spot stimulus to a skin of the back of the driver.

The tactile stimulation unit 47 shown in FIG. 1 is provided, for example, on a rim portion of the steering wheel or a seat surface of the driver seat as a part of the wake-up seat 46. The tactile stimulation unit 47 gives a stimulus to the driver through a tactile sense by the generation of vibration. The speaker 48 gives a stimulus to the driver through an auditory sense by replaying a voice message or a notification sound in the vehicle interior. The display 49 gives a stimulus to the driver through a visual sense by displaying an image. The speaker 48 and the display 49 are also used to present information to the driver.

Figure 2:
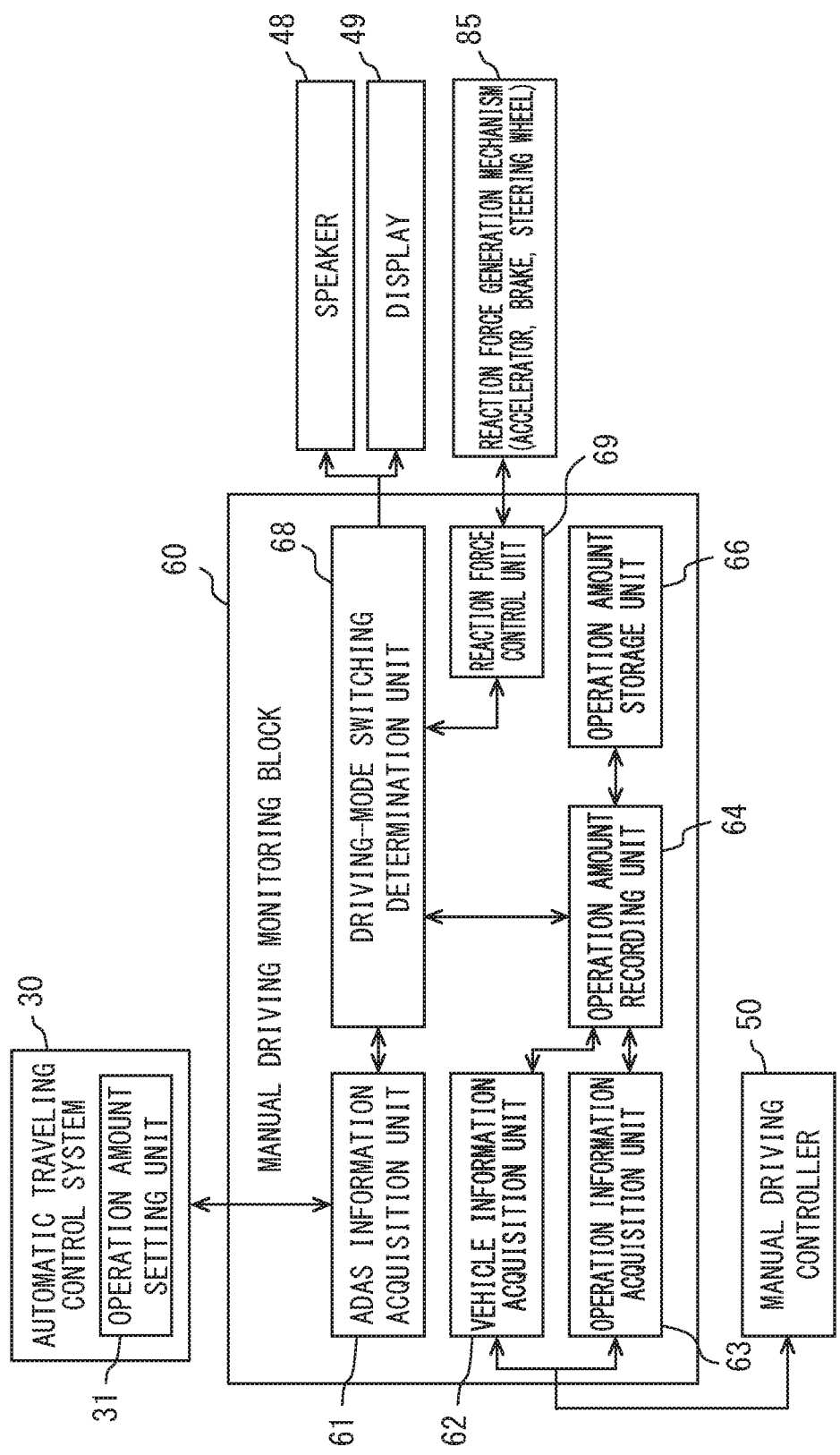
FIG. 2 is a block diagram showing details of a manual driving monitoring block.

The manual driving controller 50 shown in FIGS. 1 and 2 is a control device that controls the behavior of the vehicle based on the driving operation input by the driver in the manual driving mode. The manual driving controller 50 mainly includes a computer having a processing unit that includes at least one processor, a RAM, and memory device. The manual driving controller 50 is connected to a vehicle speed sensor 81, an acceleration sensor 82, and an operation amount sensor 84, for example.

The vehicle speed sensor 81 detects the current traveling speed of the vehicle. The acceleration sensor 82 detects the acceleration in each direction acting on the vehicle. The vehicle speed sensor 81 and the acceleration sensor 82 sequentially output the detection results to the manual driving controller 50. The manual driving controller 50 may acquire, for example, the vehicle speed information and the acceleration information from the automatic driving controller 10.

The operation amount sensor 84 is provided on the operation device such as the steering wheel, the accelerator pedal, and the brake pedal of the vehicle. The operation amount sensor 84 detects the driving operation that is input by the driver into the operation device. The operation amount sensor 84 detects a steering amount and a steering force of the steering wheel, and a pedaling amount (stepping amount) and a pedaling force of the accelerator pedal and the brake pedal, for example. The operation amount sensor 84 sequentially outputs the detected operation amount information to the manual driving controller 50.

The manual driving monitoring block 60 is configured to monitor the state of the driver. The manual driving monitoring block 60 mainly includes a computer having a processing unit 60a that includes at least one processor, a RAM, and a memory device. The manual driving monitoring block 60 includes an ADAS information acquisition unit 61, a vehicle information acquisition unit 62, an operation information acquisition unit 63, an operation amount recording unit 64, an operation amount storage unit 66, a driving-mode switching determination unit 68, and a reaction force control unit 69. These configurations may be functional blocks constructed by the processing unit 60a executing a program or may be dedicated electric circuits provided in the manual driving monitoring block 60.

The ADAS information acquisition unit 61 acquires ADAS data, a road map, road surface information, and current position information through the automatic driving controller 10. In addition, from the automatic traveling control system 30, the ADAS information acquisition unit 61 is provided with the operation guide amount defined by the operation amount setting unit 31 and the determination result of the arousal level determined by the arousal level determination unit 41.

The vehicle information acquisition unit 62 acquires the vehicle speed information and the acceleration information through the manual driving monitoring block 60. The operation information acquisition unit 63 acquires the operation amount information on the operation amount that is input into each of the steering wheel, the accelerator pedal, and the brake pedal through the manual driving monitoring block 60.

The operation amount recording unit 64 measures the operation amount of the driving operation input by the driver into the operation device. The operation amount recording unit 64 records the operation amount of the driving operation into the operation amount storage unit 66 in association with the traveling result of the vehicle by the driving operation. Specifically, the operation amount recording unit 64 stores the operation amount information acquired by the operation information acquisition unit 63 into the operation amount storage unit 66 in association with the vehicle speed information and the acceleration information acquired by the vehicle information acquisition unit 62.

The driving-mode switching determination unit 68 acquires the determination result of the arousal level by the arousal level determination unit 41 from the ADAS information acquisition unit 61. The driving-mode switching determination unit 68 checks the operation ability of the driver, who is determined by the arousal level determination unit 41 to have the arousal level at which the driving is possible, as to whether the sense of driving has been recovered sufficiently (refer to, for example, FIGS. 9 and 10). The driving-mode switching determination unit 68 sets a set period for checking the operation ability of the driver in a state where the function of the automatic driving is temporarily limited and conducts a "feedback test" to be described later in the set period.

The driving-mode switching determination unit 68 causes the driver to conduct the driving operation in the feedback test. The driving-mode switching determination unit 68 acquires operation amount information actually input by the driver through the operation amount recording unit 64. The driving-mode switching determination unit 68 compares the actual operation amount with the operation guide amount and determines whether to permit the switching from the automatic driving mode to the manual driving mode based on the comparison result.

The reaction force control unit 69 is electrically connected to a reaction force generation mechanism 85 provided in the operation device. The reaction force generation mechanism 85 is provided in each of the steering wheel, the accelerator pedal, and the brake pedal, and generates an operation reaction force against the driving operation by the driver. The reaction force generation mechanism 85 provided in the steering wheel can apply an operation reaction force to the steering shaft in a direction to decrease a steering angle. The reaction force generation mechanism 85 provided in each pedal can apply an operation reaction force to each pedal in a direction to decrease a pedaling amount.

The reaction force control unit 69 generates the operation reaction force when an excessive operation is input in the feedback test described later. As the actual operation amount deviates from the operation guide amount, the reaction force control unit 69 increases the operation reaction force generated by the reaction force generation mechanism 85. In addition, in the feedback test, the reaction force control unit 69 can limit the operation amount that can be input by the driver by using the operation reaction force applied to the operation device.

Next, the process of the driving-mode switch method for switching from the automatic driving mode to the manual driving mode will be described. In an automatic driving area in which the automatic driving mode can be used, a driving-mode switch area is set as a section in which the driving-mode switch is performed. When the vehicle autonomously traveling in the automatic driving mode moves to the manual driving area, it is necessary to complete the driving-mode switch from the automatic traveling control system 30 to the driver within the driving-mode switch area. When the driver does not wake up in the driving-mode switch area or when the sense of driving is not recovered, the switching to the manual driving mode is not performed.

Figure 6:
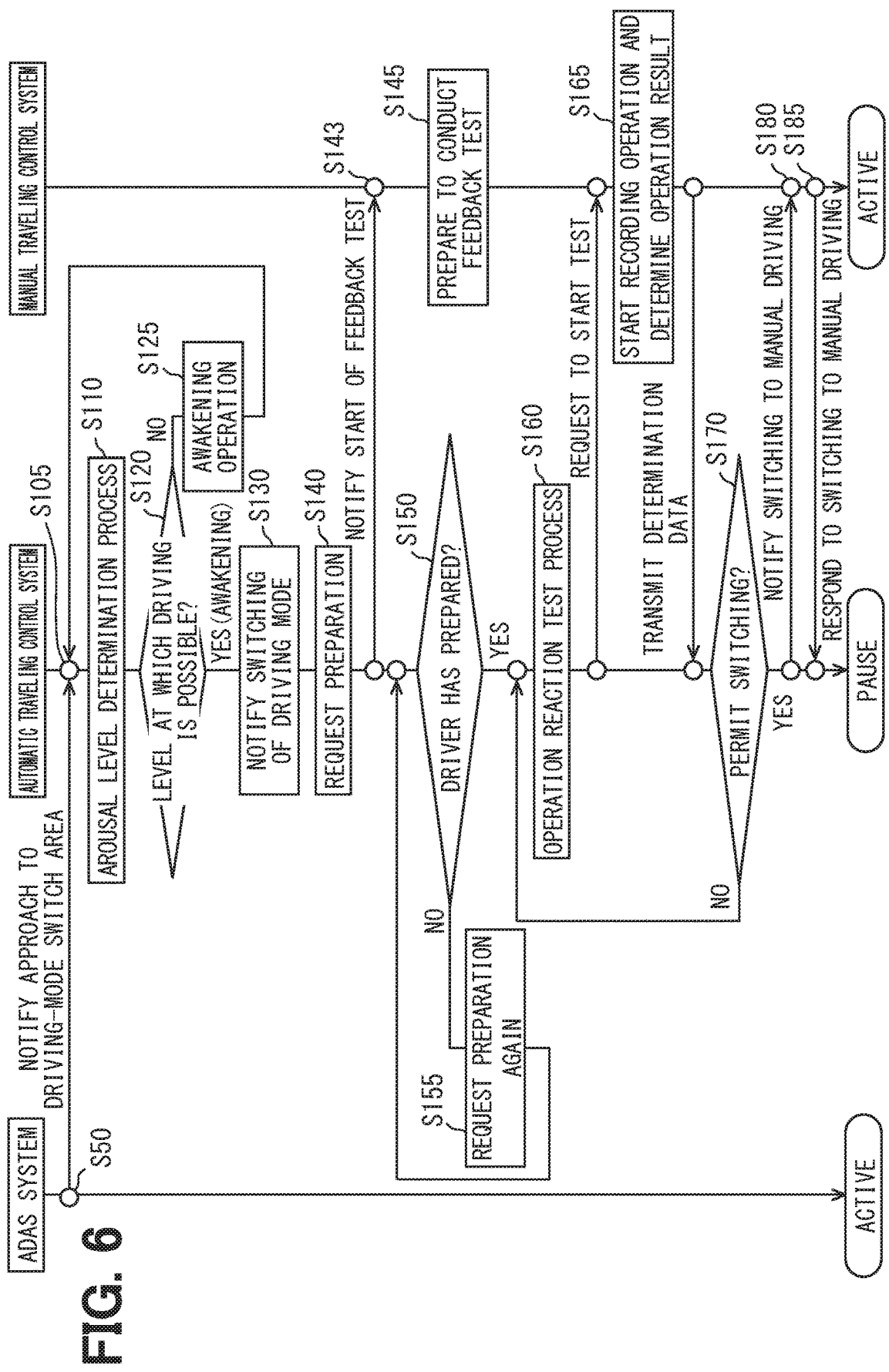
FIG. 6 is a sequence diagram showing details of a process executed in the in-vehicle system when a driving mode is switched to a manual driving.

A sequence diagram shown in FIG. 6 shows a main process in a case where the control is systematically transferred to the driver in a scene of leaving from a main roadway of an expressway. The automatic traveling control system 30 starts the automatic traveling before S105. Hereinafter, details of the main process will be described with reference to FIG. 6 while referring to FIG. 1.

In S50, the ADAS system 15 acquires information of the driving-mode switch area set immediately before the manual driving area, for example, through road-vehicle communication. The ADAS system 15 can receive information such as position information, a speed limit, and a road shape of the driving-mode switch area from a roadside machine. The ADAS system 15 notifies the automatic traveling control system 30 of the approach of the driving-mode switch area and the information on the driving-mode switch area.

In S105, the automatic traveling control system 30 acquires the notification output from the ADAS system 15 in S50. Based on the notification, the automatic traveling control system 30 informs the driver who is not performing the driving operation that the vehicle has approached a point requiring the driving-mode switch. For example, the speaker 48 and the display 49 mounted in the vehicle are used for advance notice of the switching to the manual driving. In addition, the switching to the manual driving may be notified in advance, for example, using a vibration stimulus by the tactile stimulation unit 47 provided on the seat surface.

Figure 7:
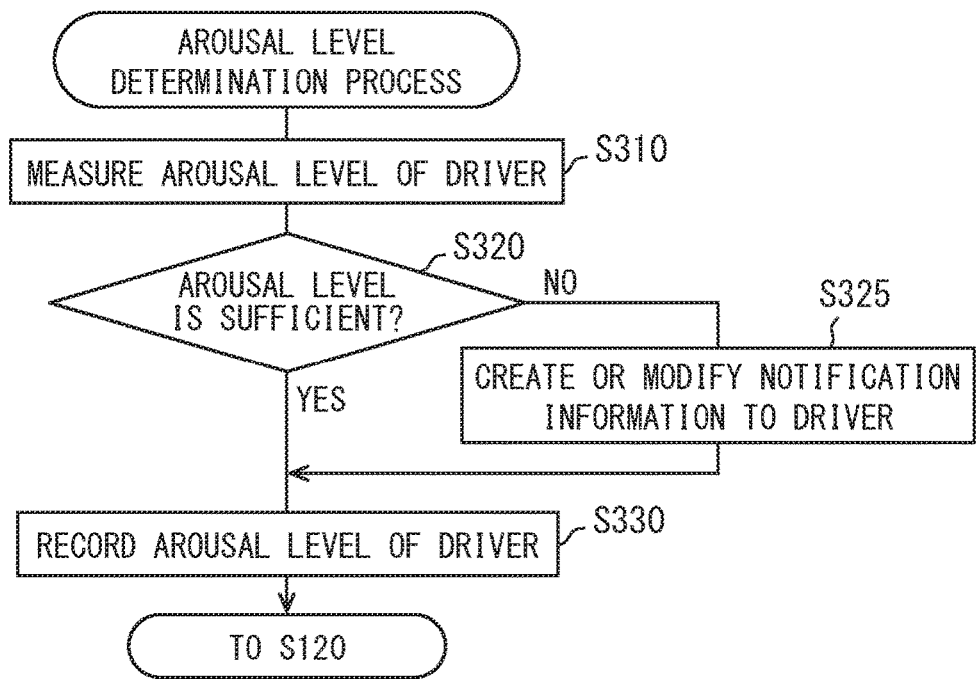
FIG. 7 is a flowchart showing details of an arousal level determination process.

In S110, the automatic traveling control system 30 performs an arousal level determination process (refer to FIGS. 7 and 8) in cooperation with the arousal level detection device 40. In S110, the determination result of the arousal level of the driver is acquired, and the process proceeds to S120. In S120, based on the determination result acquired in S110, it is determined whether the arousal level of the driver is the level at which the manual driving is possible. In S120, when it is determined that the arousal level is not the level at which the manual driving is possible, the process proceeds to S125. In S125, the driver awakening device 45 executes the awakening operation for recovering the arousal level of the driver. Upon completion of the awakening operation in S125, the process returns to S105.

On the other hand, when it is determined in S120 that the arousal level is the level at which the manual driving is possible, the process proceeds to S130. In S130, a schedule for switching from the automatic driving mode to the manual driving mode is notified to the driver. In S140, the driver is requested to prepare for the driving operation for the driving-mode switch.

Here, in order to correctly conduct the feedback test to be described later, it is necessary for the limbs of the driver to be in designated positions and to confirm the intention of the driver to drive manually. Therefore, in S140, an in-vehicle camera and the DSM 87 detect the positions of the limbs, the viewpoint position, and the visual line direction, for example. Then, notification is performed using, for example, a display and a voice so that a correct driving posture is taken.

In S143, a start schedule of the feedback test for confirming the recovery degree of the sense of driving of the driver is notified from the automatic traveling control system 30 to the manual traveling control system 70. The manual traveling control system 70 acquires the notification from the automatic traveling control system 30 as a preparation command for the feedback test and starts a preparation for conducting the feedback test in S145.

The automatic traveling control system 30 determines whether the driver has completed the preparation for the driving operation in S150. In S150, the driving posture of the driver is checked based on the information of the in-vehicle camera and the DSM 87. When it is determined in S150 that the preparation for driving operation has not been completed, the process proceeds to S155, in which the driver is again notified of the preparation request for the driving-mode switch. Until the preparation for driving is completed, the determination in S150 and the request notification in S155 are repeated for a predetermined time or a predetermined number of times. When the driver does not complete the preparation for the driving operation even though the request for the driving preparation is repeated, an evacuation procedure to be described later is executed.

When it is determined in S150 that the preparation for the driving operation is completed, the automatic traveling control system 30 starts an operation reaction test process (refer to FIGS. 9 and 10) in S160. Based on the operation reaction test process in S160, the automatic traveling control system 30 requests the manual traveling control system 70 to start the motion of the feedback test.

Based on the request to start the feedback test, the manual traveling control system 70 starts recording the driving operation that is input by the driver in S165. Further, in S165, it is determined whether the sense of driving has been recovered based on the recording of the input driving operation. The manual traveling control system 70 transmits determination data indicating the recovery degree of the sense of driving to the automatic traveling control system 30.

The automatic traveling control system 30 takes the determination data obtained in S165 into consideration and determines whether to permit the switching from the automatic driving mode to the manual driving mode in S170. When the switching to the manual driving mode is rejected in S170, the process returns to S160 and the operation reaction test process is performed again. On the other hand, when the switching to the manual driving mode is permitted in S170, the process proceeds to S180.

In S180, the automatic traveling control system 30 notifies the manual traveling control system 70 of an instruction to make switching to the manual driving. In S185, the manual traveling control system 70 transmits a response to the notification made in S180 to the automatic traveling control system 30. As described above, the manual traveling control system 70 brings the manual driving by the driver into an active state. On the other hand, the automatic traveling control system 30 receives the response from the manual traveling control system 70 and brings the automatic driving into a pause state.

The automatic traveling control system 30 notifies the driver of the start of the manual driving in accordance with the timing for switching to the manual driving. For such notification, for example, the speaker 48 and the display 49 are used. As an example, as a countdown for the start of manual driving, a voice message as follows is reproduced: "Manual operation will start. Three, two, one, start!"

For a case where the processes of S50 to S185 cannot be completed within the driving-mode switch area, for example, a slow section and a wake-up area are provided in a connection section of the automatic driving area which is connected to the manual driving area. In the slow section, driving at a reduced speed by the automatic driving is permitted. In the wake-up area, parking for a short time is permitted. When it is difficult to complete switching to the manual driving mode, by using the slow section and the wake-up area as the evacuation procedure, the time to return to the state in which the manual driving is possible is ensured.

Next, details of the arousal level determination process performed in S110 described above will be described with reference to FIG. 7 while referring to FIG. 1. The arousal level determination process is executed by the arousal level detection device 40 based on a command from the automatic traveling control system 30.

In S310, the arousal level of the driver is measured, and the process proceeds to S320. In S320, it is determined whether the arousal level measured in S310 immediately before exceeds a level sufficient for the manual driving (refer to level 5 in FIG. 8). In S320, when it is determined that the arousal level is sufficient, the process proceeds to S330. On the other hand, when it is determined in S320 that the arousal level is not sufficient, the process proceeds to S325.

In S325, as notification information, the stimulus level of the awakening operation executed in S125 (refer to FIG. 6) is set in accordance with, for example, the height and a transition of the arousal level of the driver, and the process proceeds to S330. In first S325, the notification information is created in accordance with an initial arousal level to be described later. In second or subsequent S325, the notification information is corrected in accordance with the arousal level measured in S310 immediately before. The lower the arousal level of the driver, or the longer the time when the arousal level remains unimproved, the stronger stimulus the driver is given.

In S330, the arousal level of the driver is recorded, and the process returns to S120 (refer to FIG. 6) of the main process. When the driver awakening device 45 performs some sort of awakening operation, the arousal level of the driver is recorded in association with the result of performing the awakening operation in S330, and the process returns to S120. In S120, the record of the arousal level kept in S320 is comprehensively determined, and it is determined whether the arousal level of the driver is the level at which the manual driving is possible.

As described so far, when the arousal level of the driver is not the level at which the manual driving is possible, the awakening operation in accordance with the arousal level is executed. For example, it is assumed that the awakening operation is started based on settings of a voice level 3, a display change level 3, and a vibration change level 1. When the arousal level of the driver does not improve with such an awakening operation, the notification information is corrected to settings of a voice level 4, a display change level 5, and a vibration change level 3 so that the driver can be easily awakened.

Figure 8:
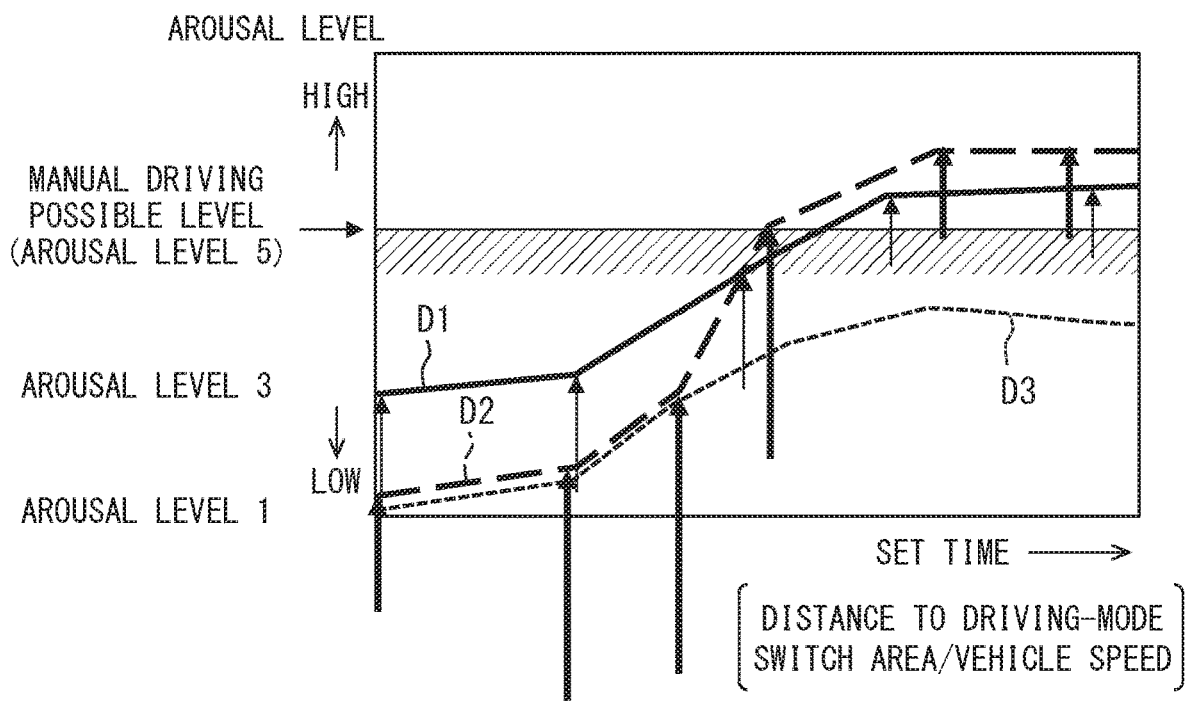
FIG. 8 is a diagram showing details of an awakening operation performed by the driver awakening device.

Details of the above awakening operation will be further described with reference to FIG. 8 while referring to FIG. 1. FIG. 8 describes three examples of temporal changes in the arousal level of the driver. Upward arrows in FIG. 8 each indicate a stimulus that is given to the driver. The length of each of the arrows indicates the magnitude (strength) of the stimulus. The set time on the horizontal axis is a value obtained by dividing the distance from the current position to the driving-mode switch area by the current vehicle speed.

A line D1 indicates a temporal change in an example of the awakening operation on a driver with an initial arousal level being not so low. As in the example of the line D1, when the initial arousal level is about level 3, the notification information for providing the driver with a standard magnitude stimulus is set. Since the initial arousal level is not so low, even with the standard stimulus, the arousal level of the driver has been recovered to the level where the manual driving is possible. The recovery of the arousal level from level 3 to level 5 is realized, for example, by giving a stimulus in a combination of the voice and the seat surface vibration.

A line D2 indicates a temporal change in an example of the awakening operation on a driver with a considerably low initial arousal level. As in the example of the line D2, when the initial arousal level is about a level 1, the information for periodically providing the driver with a stimulus larger than the standard stimulus is set. By giving such a strong stimulus, the arousal level of the driver can be recovered in a short time. Such a sudden recovery of the arousal level from level 1 to level 5 is realized by giving a stimulus to a pain spot with the protrusions 46d (refer to FIG. 5) while forcibly changing the posture of the driver with the inflatable member 46b (refer to FIG. 4).

A line D3 indicates an example in which a provision of a stimulus to a driver with a considerably low initial arousal level is interrupted. That is, D3 indicates the transition of the arousal level when no stimulus is given to the driver. Specifically, on the line D3, no stimulus is given for the third time or thereafter. As a result, the arousal level of the driver is going to be recovered by the stimulus and then falls again. Consequently, the arousal level does not reach the level at which the manual driving is possible.

As described above, the driver awakening device 45 to be actuated may be appropriately selected in accordance with the initial arousal level of the driver and the amount of change in the arousal level. When the arousal level of the driver is low, an awakening operation such as gradually giving a larger stimulus may be performed so that the arousal level becomes the level at which the manual driving is possible in a short time. Further, the awakening operation of the driver awakening device 45 is continued until it is determined that the arousal level is the level at which the manual driving is possible so as not to be the example of the line D3.

Figure 9:
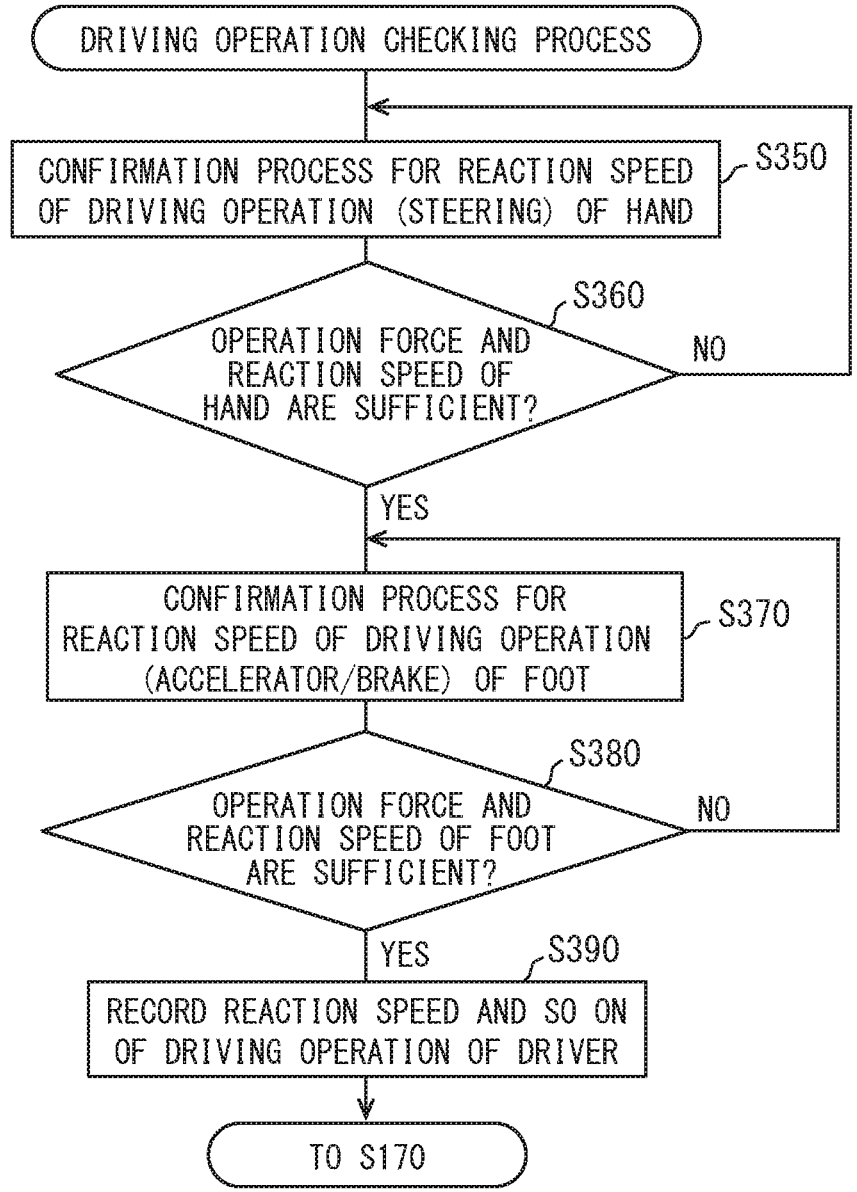
FIG. 9 is a flowchart showing details of a driving operation checking process.

Next, details of a driving operation checking process performed mainly by the driving-mode switching determination unit 68 will be described with reference to FIG. 9 while referring to FIG. 2. The driving operation checking process is started with the operation reaction testing process of the main process (refer to S160 in FIG. 6) as a trigger. In the driving operation checking process, the driving operation that is input into the steering wheel and each pedal is checked in a state where the automatic driving is partially canceled. In addition, when the automatic driving continues, the driver keeps the same posture for a long time and may come into the state of not moving the limbs for a long time. In the driving operation check, it is also possible to check whether the driver has come down with a symptom such as numbness which disturbs the driving operation.

In S350 and S360, a movement of a hand of the driver is measured, and it is confirmed whether the driver can reliably perform the steering operation. In S350, a confirmation process (refer to FIG. 10) for the driving operation that is input from the hand into the steering wheel is performed, and the process proceeds to S360. In S350, a grip force and a steering force (operation force) by the steering operation, and a time delay (reaction speed) of a motion of the driver with respect to the notification are measured by the feedback test.

In S360, with respect to the driving operation of the hand confirmed in S350, it is determined whether the operation force and the reaction speed have been sufficient for the manual driving. In the determination made in S360, the result of the feedback test on the steering operation is quoted. When it is determined in S360 that the driving operation with the level where the manual driving is possible has been input, the process proceeds to S370. On the other hand, when the movement of the hand is at a level where the manual driving is difficult, the process returns to S350 and the confirmation process for the steering operation is re-executed.

In S370 and S380, a movement of a foot of the driver is measured, and it is confirmed whether the driver can reliably operate each pedal. In S370, the confirmation process (refer to FIG. 10) for the driving operation that is input from the foot into the accelerator pedal or the brake pedal is performed, and the process proceeds to S380. In S370 as well, similarly to S350, a pedaling force (operation force) in the pedal operation, and a time delay (reaction speed) of a motion with respect to the notification are measured by the feedback test.

In S380, with respect to the driving operation of the foot confirmed in S370, it is determined whether the operation force and the reaction speed have been sufficient for the manual driving. In the determination made in S380, the result of the feedback test on the pedal operation is quoted. When it is determined in S380 that the driving operation with the level where the manual driving is possible has been input, the process proceeds to S390. On the other hand, when the movement of the foot is at a level where the manual driving is difficult, the process returns to S370 and the confirmation process for the pedal operation is re-executed.

In S390, the operation force and the reaction speed measured in S350 and S370 are recorded, and the process returns to S170 (refer to FIG. 6) of the main process. In S390, the determination data of the driving operation checking process is transmitted to the automatic traveling control system 30. In S170, the contents of the driving operation recorded in S390 are comprehensively determined, and it is determined whether to permit the switching from the automatic driving mode to the manual driving mode. When switching to the manual driving mode is not permitted in S170, the driving operation checking process is performed again.

Next, details of the confirmation process performed in S350 and S370 will be described with reference to FIG. 10 while referring to FIGS. 1 and 2. In the confirmation process, the operation guide amount is set as a reference for evaluating the driving operation of the driver, and the actual operation amount is compared with the operation guide amount. As an example, the operation guide amount is defined by the operation amount setting unit 31 in accordance with the road situations during traveling and is provided to the driving-mode switching determination unit 68 during the set time. In the confirmation process, it is tested, by comparison with the operation guide amount, whether the driving operation can be performed in accordance with the road situations. For a driver who is in a state where the driving operation ability is insufficient, a reaction force feedback that reminds the driver of a normal sense of driving is performed.

In S400, the arousal level of the driver is notified to the driver by using the display 49, for example, and the process proceeds to S410. In S400, it is also notified that the current arousal level is the level at which the manual driving is possible. In S410, for example, by using the display 49, the driver is notified that the driving operation will be checked, and the process proceeds to S420. In S420, the operating procedure of the operation device is notified, for example, with a voice message, and the process proceeds to S430. As an example, in S420 in the case of confirming the operation on the accelerator pedal, a voice message as follows is reproduced: "Let's accelerate from the current speed to the limit speed. Three, two, one, start!"

In S430, the manual driving is temporarily permitted in accordance with the countdown in S420. The automatic driving function is limited by the mode switching unit 21. In S430, the driver is notified that the manual driving is possible.

In S440, the measurement of the driving situation is started based on the detection that the driver has started operating the operation device. In S440, the operation amount that is input into the operation device is acquired. In S450, the operation guide amount provided by the automatic traveling control system 30 is compared with the measured actual operation amount. The operation amount setting unit 31 defines the operation guide amount based on a correlation line CL indicating the correlation between the acceleration of the vehicle and the operation amount.

Figure 11:
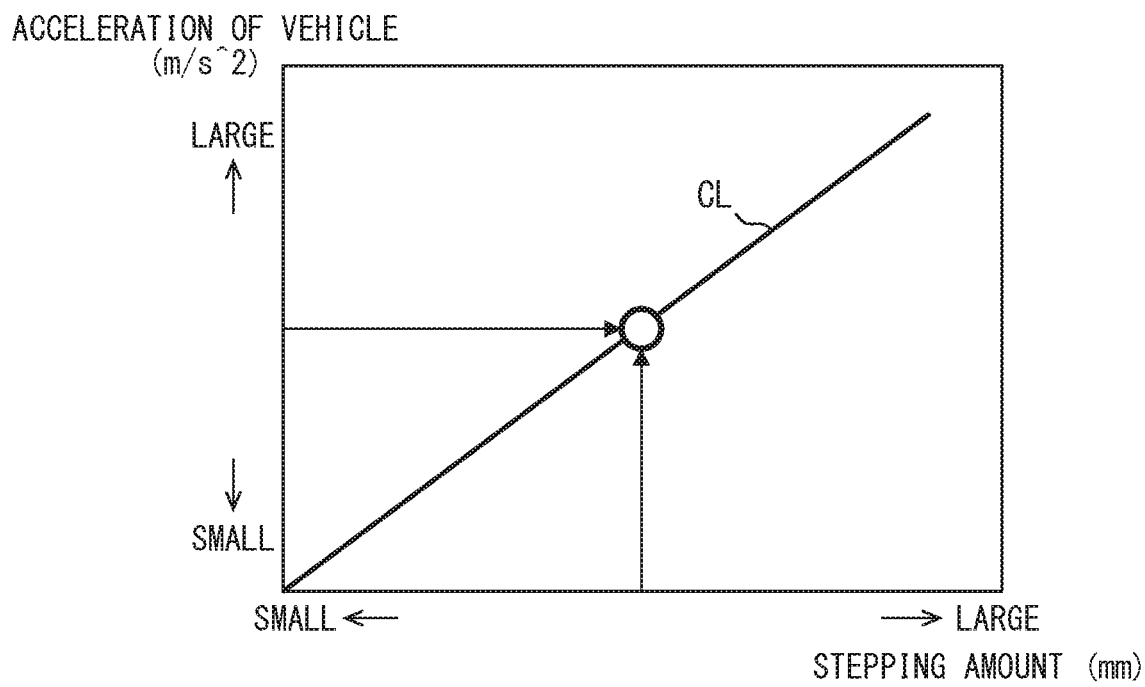
FIG. 11 is a diagram showing a correlation between a stepping amount of an accelerator pedal and an acceleration of a vehicle.

As an example, on the correlation line CL indicated in FIG. 11, the stepping amount of the accelerator pedal is proportional to the acceleration of the vehicle. The operation amount setting unit 31 calculates acceleration to be generated in the vehicle in accordance with the road situations during traveling and applies the calculated acceleration to the correlation line CL, thereby defining the stepping amount as the operation guide amount. The correlation line CL is not limited to the proportional relationship.

Figure 10:
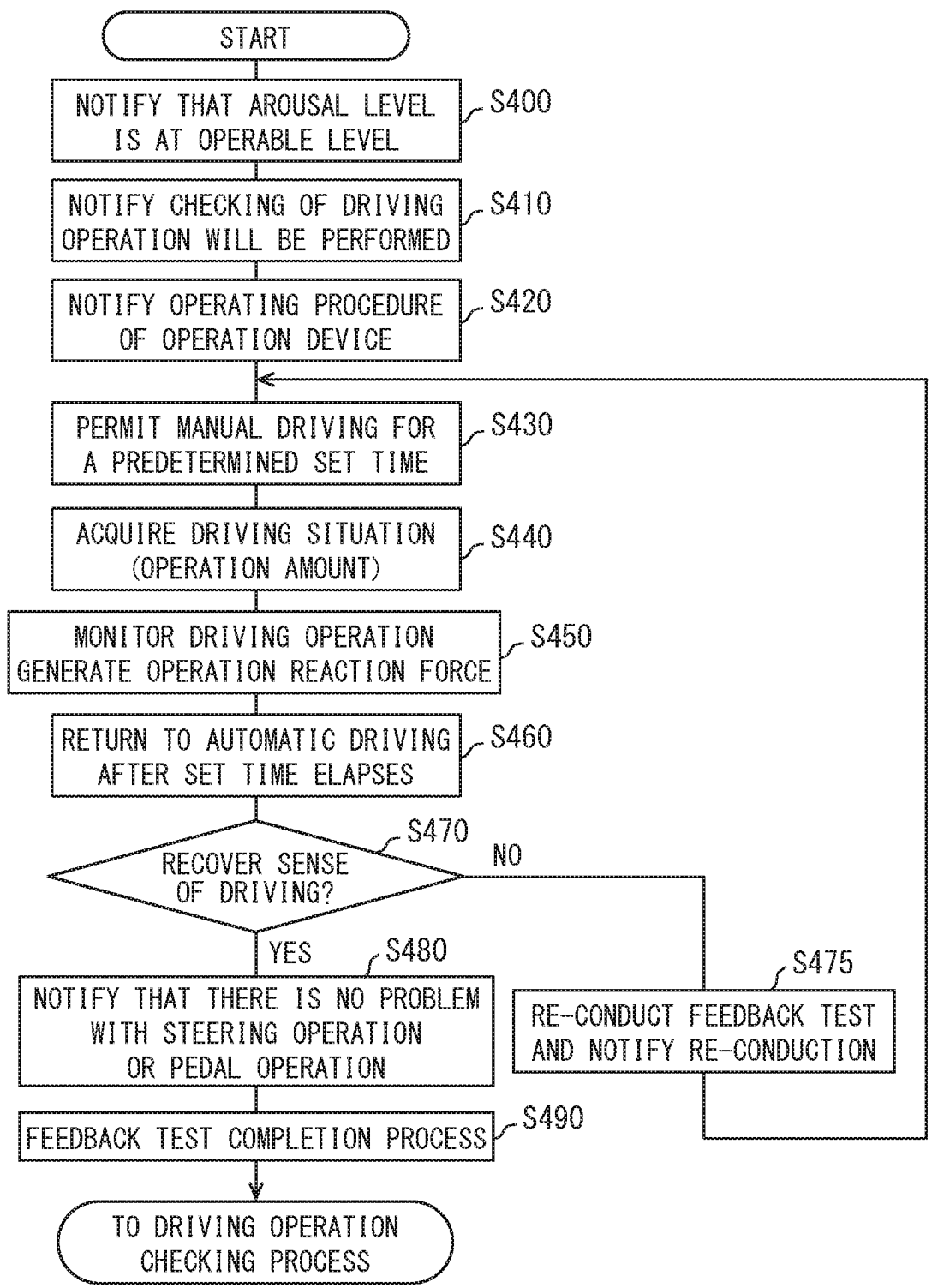
FIG. 10 is a flowchart showing details of a confirmation process for conducting a feedback test.

In S450 of FIG. 10, the driving operation of the driver is monitored, and when an excessive driving operation is input, the reaction force generation mechanism 85 is caused to generate an operation reaction force that reduces the operation amount. The operation reaction force applied from the reaction force generation mechanism 85 to the operation device is set in accordance with the excess of the operation amount from the operation guide amount.

Figure 12:
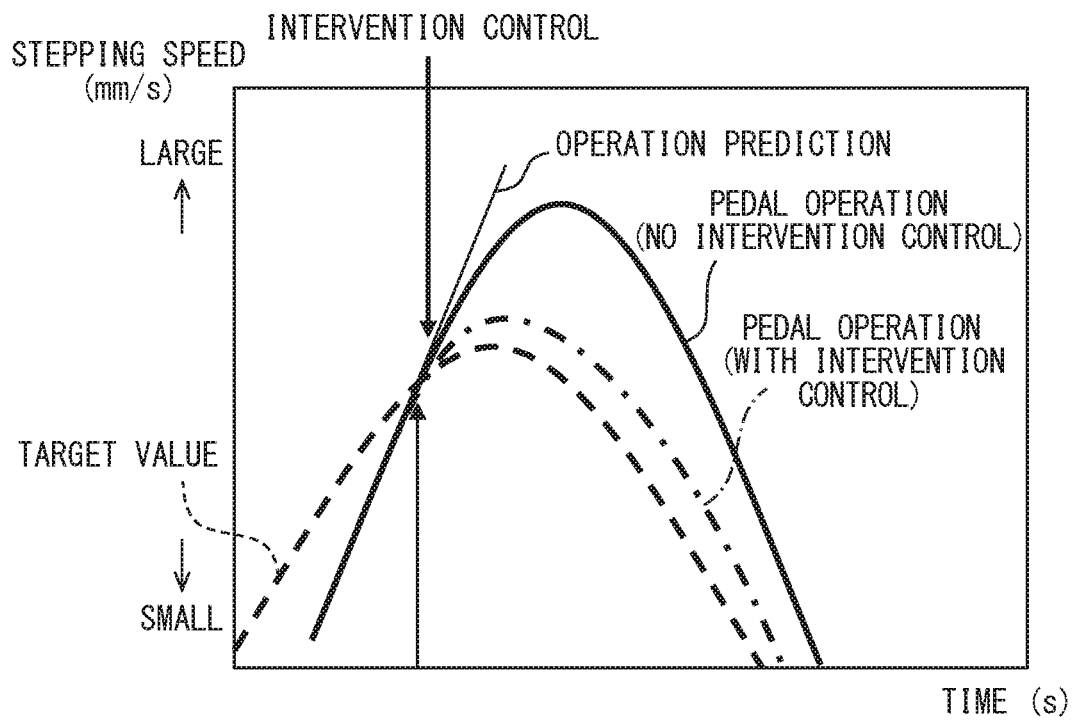
FIG. 12 is a diagram for explaining an effect of a reaction force feedback.

As an example, a broken line indicated in FIG. 12 indicates a target value of the pedal operation to be performed by the driver. The target value is a value based on the operation guide amount. More specifically, in order to cause the vehicle to travel at a target speed, the driver gradually increases the stepping amount of the accelerator pedal, and when a predetermined stepping amount is reached, the driver keeps the stepping amount constant. When the speed at which the accelerator pedal is stepped on rapidly increases as indicated by a solid line in FIG. 12, there is established an operation prediction that the operation amount of the accelerator pedal will become excessive. In this case, undesirable acceleration occurs in the vehicle.

Then, the operation reaction force applied to the accelerator pedal induces the driving operation of the driver so that the stepping amount (refer to FIG. 11) remains at the amount corresponding to the operation guide amount (refer to one-dot chain line in FIG. 12). The driver feels the operation reaction force applied to the operation device, thereby feeling that the input into the operation device has been excessive. As a result, the driver recalls an appropriate operation amount and recovers the sense of driving. As described above, in the processes of S430 to S450, the checking of the driving operation accompanied by the reaction force feedback is performed. Therefore, such checking of driving operation is referred to as the "feedback test" as described above.

In S460 of FIG. 10, the elapse of the set time is determined, and the driving mode is returned to the automatic driving mode. Specifically, the limitation of the automatic driving function by the mode switching unit 21 is canceled, and the vehicle resumes traveling in the normal automatic driving mode.

In S470, it is determined whether the sense of driving has been recovered based on the result of the feedback test. In S470, the recovery degree of the sense of driving is determined based on whether the actual operation amount has been within a permissible threshold value with reference to the operation guide amount during a comparison period for conducting the feedback test. When the test result is that the operation amount frequently has exceeded the permissible threshold value during the comparison period, it is determined in S470 that the sense of driving has not been recovered, and the process proceeds to S475.

In S475, it is determined that the feedback test will be conducted again. In S475, the driver is notified that the manual driving feedback test will be conducted again, and the process returns to S430. As an example, in S475 in the case of reconfirming the accelerator pedal operation, a voice message as follows is reproduced: "The way of stepping is . . . . Let's do it again. Three, two, one, start!"

On the other hand, when the actual operation amount has changed within a range not greater than the permissible threshold value during the comparison period for conducting the feedback test, it is determined in S470 that the sense of driving has been recovered, and the process proceeds to S480. In S480, the driver is notified that the steering operation or the pedal operation is in the state of having no problem, and the process proceeds to S490. In S490, a completion process for the feedback test is performed, and the process proceeds to S360 or S380 (refer to FIG. 9) of the driving operation checking process. In S360 and S380, in response to the result of the feedback test, there is made an affirmative determination that the operation force and reaction speed are sufficient, and the process proceeds to S170 (refer to FIG. 6) of the main process. In S170, when the determination to permit the switching is made, the control of the vehicle is transferred to the driver, and the traveling by the manual driving is started.

When a plurality of feedback tests are conducted based on a negative determination in S470, in the first feedback test, the larger the difference of the operation amount from the operation guide amount, the more the operation reaction force is increased in the next feedback test. More specifically, in the first feedback test, it is confirmed what kind of driving operation is defective. Then, the second or subsequent feedback test is conducted to correct the defect in the previous driving operation.

For example, when the pedal operation on the brake pedal has been apt to be sudden braking, the operation reaction force to be applied from the reaction force generation mechanism 85 to the brake pedal is adjusted, and an optimum stepping amount is presented to the driver through the tactile sense. Alternatively, the pedal operation of the driver may be assumed, and an operation reaction force to such an extent as to make the pedal operation difficult may be applied so that excessive pedaling is not performed.

In the first embodiment described so far, as a first step, it is confirmed that the driver is in the arousal state before the vehicle reaches the driving-mode switch area, and as a second step, it is confirmed that the driving operation can be performed at the level where the manual driving is possible. Then, when these mental conditions and physical conditions are confirmed sequentially and both are satisfied, the switching is made from the automatic driving mode to the manual driving mode.

As described above, in the first embodiment, after the confirmation that the arousal level is the level at which the driving is possible, it is determined whether to permit the switching from the automatic driving mode to the manual driving mode. As described above, when the arousal level of the driver is determined before the recovery of the sense of driving is confirmed, the driver performs the driving operation in the arousal state, so that the driver can easily recover the sense of driving through the input of the driving operation into the operation device. As a result, the switching from the automatic driving to the manual driving is also easily permitted, thereby enabling a smooth drive-mode switch from the automatic driving function to the driver. When the driver has recovered the sense of driving, it is possible to restrict erroneous operation after switching to the manual driving mode.

In addition, in the first embodiment, a driver with a fallen arousal level recovers the arousal level by the awakening operation of the driver awakening device 45. In this way, when the arousal level of the driver can be forcibly recovered, it is possible to smoothly shift from the determination on the arousal level to the determination of whether to permit the driving-mode switch. As a result, the driving-mode switch from the automatic driving to the manual driving becomes even smoother.

Further, in the first embodiment, the awakening operation of the driver awakening device 45 continues continuously or intermittently until the arousal level of the driver is recovered to the level at which the manual driving is possible. According to the above awakening operation, the driver awakening device 45 can increase the certainty of recovering the arousal level to the level at which the manual driving is possible.

Moreover, in the first embodiment, the wake-up seat 46 adopted as the driver awakening device 45 performs the awakening operation to give the feeling of pressure to the skin of the driver, the awakening operation to move the skeleton of the driver to the predetermined appropriate position, and some other motion. According to such awakening operations, the driver is given a strong stimulus. It is thus possible to recover the arousal level in a short time.

Additionally, in the first embodiment, the operation guide amount is set based on the driving characteristics of each driver. There is thus reduced a situation where the recovery degree of the sense of driving is evaluated using a reference not suitable for the driving characteristic of the driver.

In the first embodiment, the automatic driving function is temporarily limited during the set period when the feedback test is conducted. Therefore, the driving operation of the driver in the feedback test is reflected in the behavior of the vehicle. As a result, the driver inputs the driving operation with an appropriate feeling of tension, and hence the driver easily recovers the sense of driving.

Furthermore, in the first embodiment, during the comparison period for conducting the feedback test, based on an input of an excessive operation amount or prediction of a motion leading to an excessive operation amount, an operation reaction force in a direction to decrease the operation amount is applied to the operation device. Through such reaction force intervention control, even when the feedback test is conducted in a state where the driving operation is reflected in the vehicle behavior, it is possible to prevent a situation where the excessive driving operation of the driver is directly reflected in the vehicle behavior. In addition, when the magnitude of the operation reaction force is adjusted so that the operation amounts of the steering wheel and each pedal come close to the operation guide amounts, the driver can grasp appropriate operation amounts at an early stage. It is thus possible to shorten the time required for recovering the sense of driving.

In the first embodiment, the automatic driving controller 10 corresponds to the "automatic driving device", the manual driving controller 50 corresponds to the "manual driving device", and the in-vehicle system 100 corresponds to the "driving-mode switch control system." Further, the mode switching unit 21 corresponds to the "automatic driving limiting unit", and the mode switching unit 21 and the driving-mode switching determination unit 68 correspond to the "switch determination unit."

Second Embodiment

Figure 13:
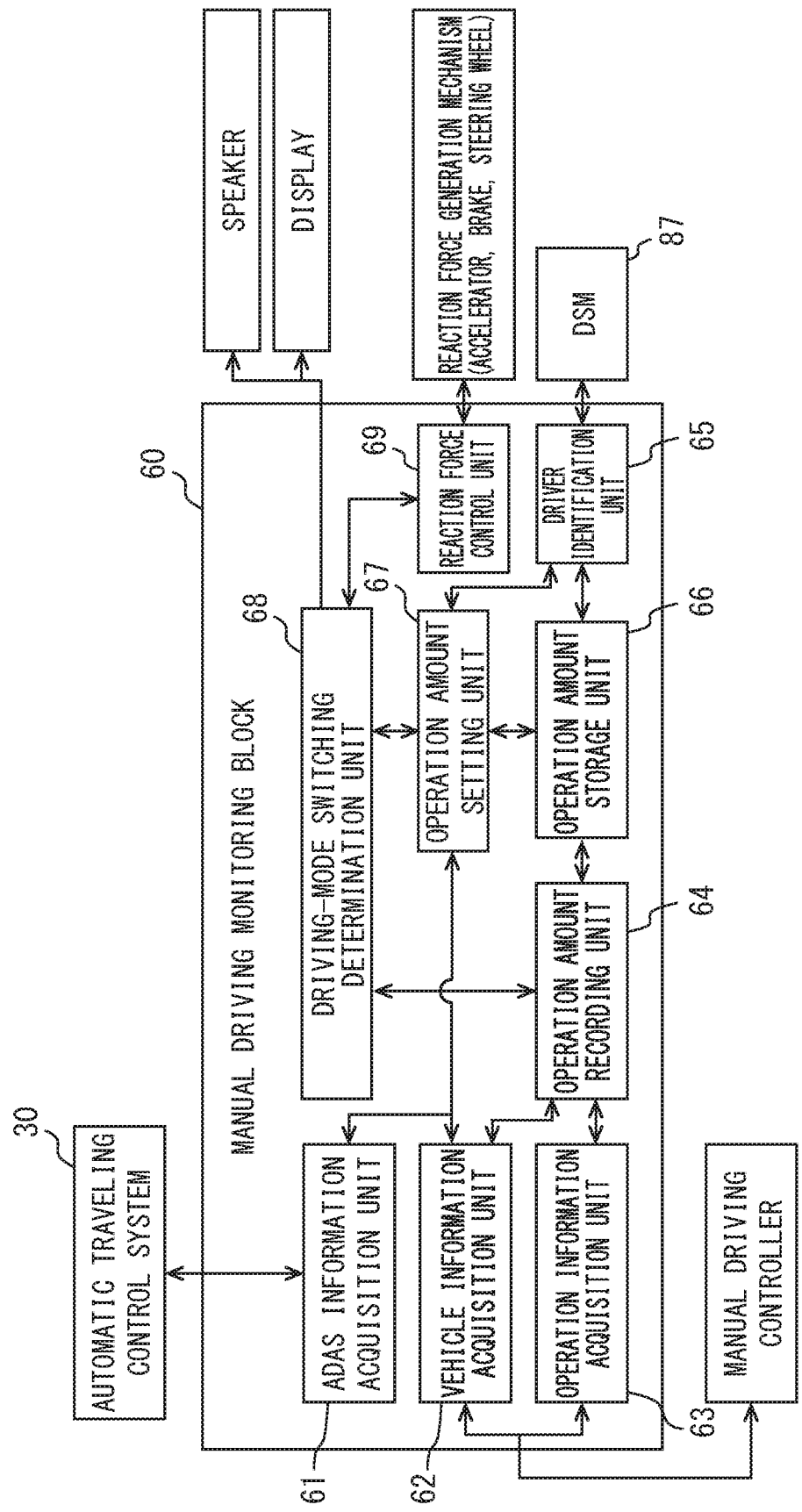
FIG. 13 is a block diagram showing details of a manual driving monitoring block according to a second embodiment of the present disclosure.
Figure 14:
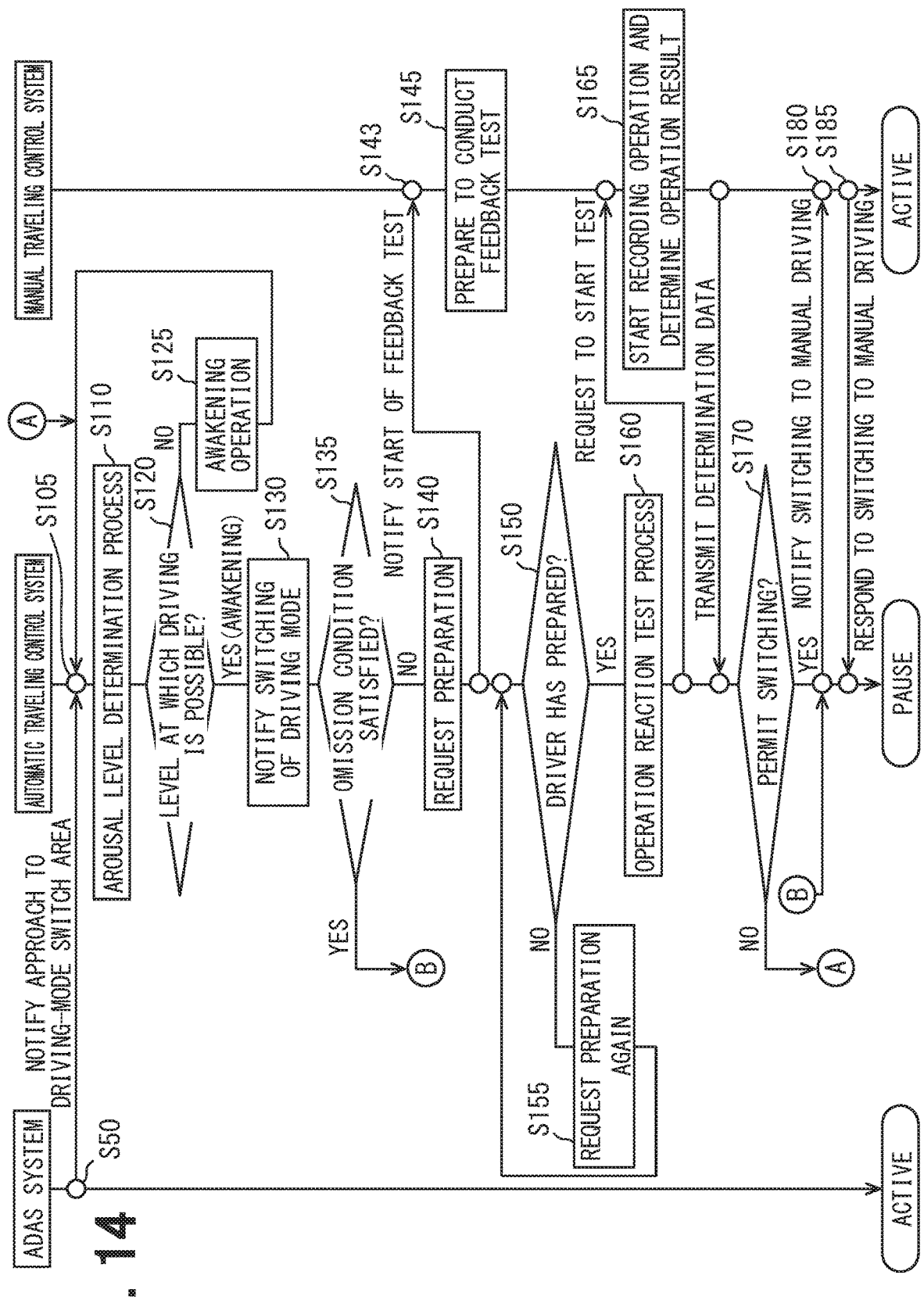
FIG. 14 is a sequence diagram showing details of a process in the second embodiment.

A second embodiment of the present disclosure illustrated in FIGS. 13 and 14 is a modification of the first embodiment. In the second embodiment, an operation guide amount suitable for the driving characteristics of the driver is defined in the manual driving monitoring block 60. In the manual driving monitoring block 60 of the second embodiment, in addition to the functional blocks (61 to 64, 66, 68, 69) substantially identical to those of the first embodiment, a driver identification unit 65, an operation amount storage unit 66, and an operation amount setting unit 67 are constructed.

The driver identification unit 65 is directly or electrically connected to the DSM 87, for example. The driver identification unit 65 identifies the driver who is driving by analyzing the face image of the driver photographed with the DSM.

The operation amount storage unit 66 stores characteristics of the driving operation for each driver during the period of the manual driving mode. The operation amount storage unit 66 stores the history of the driving operation recorded in the operation amount recording unit 64 in association with the identification information of the driver identified by the driver identification unit 65. The operation amount storage unit 66 specifies the driver and measures the operation amount that is input into the operation device by the specified driver under a plurality of road conditions and a plurality of speed conditions. Then, the operation amount storage unit 66 stores the measurement result as information indicating the driving characteristics of each driver.

The operation amount setting unit 67 has a configuration corresponding to the operation amount setting unit 31 (refer to FIG. 2) of the first embodiment. Based on the information acquired from the ADAS information acquisition unit 61 and the vehicle information acquisition unit 62, the operation amount setting unit 67 grasps the road situations during traveling and the traveling state of the vehicle. The operation amount setting unit 67 sets an operation guide amount suitable for the road situations in which the vehicle is traveling based on the driving characteristics of each driver learned by the operation amount storage unit 66 and provides the set operation guide amount to the driving-mode switching determination unit 68.

Next, details of a main process of the second embodiment will be described. In S135 of the main process, it is determined whether an omission condition for omitting the processes of S140 to S170 has been satisfied. More specifically, even when the arousal level is not recovered by the driver awakening device 45 (refer to FIG. 1), the omission condition is satisfied when the driver holds the arousal level at which the manual driving is possible. When the automatic traveling control system 30 determines in S135 that the omission condition has been satisfied, the process proceeds to S180. In this case, the driving-mode switching determination unit 68 permits the mode switching unit 21 (refer to FIG. 1) to make the switching from the automatic driving to the manual driving without a comparison between the operation amount and the operation guide amount.

In addition, in S170 of the main process, when switching from the automatic driving mode to the manual driving mode is rejected, the arousal level determination process is performed again in S110. By re-executing the arousal level determination process, the arousal level determination unit 41 (refer to FIG. 1) re-determines whether the arousal level of the driver maintains the level at which the manual driving is possible. Then, when it is determined by the re-determination that the arousal level maintains the level at which the manual driving is not possible, the automatic traveling control system 30 performs the driving operation checking process again.

Even in the configuration in which the operation guide amount is set in the manual driving monitoring block 60 as in the second embodiment described so far, a similar effect to that in the first embodiment is exerted, thereby enabling the driving mode to be smoothly switched from the automatic driving function to the driver.

In addition, in the second embodiment, the feedback test for comparing the operation amount with the operation guide amount is selectively conducted only for a driver with the arousal level recovered to the level at which the manual driving is possible by the actuation of the driver awakening device 45 (refer to FIG. 1). For example, when the duration of the automatic driving is short, the arousal level of the driver can be kept high. At this time, the driver can be estimated not to have lost the sense of driving. When the feedback test is conducted in such a case, the driver feels that the feedback test is bothersome. Therefore, it is desirable to omit the feedback test for the driver with the arousal level not fallen.

In the second embodiment, when the driving-mode switching determination unit 68 determines that the recovery of the sense of driving is not sufficient, the arousal level determination unit 41 (refer to FIG. 1) re-determines the arousal level. For example, even when the arousal level is temporarily recovered, the arousal level may fall during the feedback test. Therefore, when the re-determination of the arousal level is performed, the driver to be subjected to the feedback test is limited to a driver with a high arousal level who can recover the sense of driving. It is thus possible to more smoothly switch the driving mode from the automatic driving function to the driver.

Other Embodiments

Although the plurality of embodiments of the present disclosure have been described above, the present disclosure is not interpreted as being limited to the above embodiments, but can be applied to various embodiments and combination of those within a scope not deviating from the gist of the present disclosure.

In the above embodiments, when the arousal level of the driver is low, the driver awakening device has executed the awakening operation. However, the configuration corresponding to the driver awakening device and the actuation control unit may be omitted. Further, the configuration provided as the driver awakening device may be changed as appropriate.

In the feedback test of the above embodiments, the operation guide amount serving as a determination reference is set to a value corresponding to the learned driving characteristics of the driver. However, the operation guide amount does not need to be adjusted for each driver. The operation ability checking of the driver may be performed based on the predetermined specific operation guide amount.

The checking of the driving operation in the above embodiment has been sequentially executed for all the operation devices. However, such operational ability checking may be performed only on one of the accelerator pedal and the brake pedal or may be performed only on the steering wheel. Further, in the system with the reaction force control unit and the reaction force generation mechanism omitted therefrom, the operation ability checking does not need to be a feedback test involving a reaction force feedback. In addition, the operation ability checking may be performed in a state where the input into the operation device is not reflected in the behavior of the vehicle. In the above embodiments, the permission threshold value used for the operation ability checking is a value having both positive and negative margins with respect to the value set as the operation guide amount. In order to prevent excessive operation, it is desirable that the margin from the operation guide amount to a plus-side permission threshold value be made smaller than the margin to a minus-side permission threshold value.

In the second embodiment, the feedback test has been omitted for the driver with the arousal level not fallen during the automatic driving. However, for example, a selective question as to whether to conduct the feedback test may be asked to a driver who has held the arousal level, and the feedback test may be omitted based on the choice by the driver. In addition, an inquiry as to whether to conduct the feedback test may be made to a driver who has recovered the arousal level by the actuation of the driver awakening device. Even in this case, the feedback test can be omitted based on the choice of the driver.

The flowchart described in the present disclosure, or the process of the flowchart, is made up of a plurality of sections, and each section is expressed as, for example, S105. Further, each section can be divided into a plurality of sub-sections, while a plurality of sections can be combined into one section. Moreover, each section configured in this manner can be referred to as a circuit, a device, a module, or means.

In addition, each of the plurality of sections or the combined section can be realized not only as: (i) a software section combined with a hardware unit (e.g., computer), but also as: (ii) a hardware section (e.g., integrated circuit, wiring logic circuit), with or without the function of the relevant device. Further, the hardware section can also be configured inside the microcomputer.

Each function for realizing the driving-mode switch control system may be realized by the processing unit with any configuration among the automatic driving controller 10, the communication device 20, the arousal level detection device 40, the manual driving monitoring block 60, and the manual traveling control system 70. Various non-transitory tangible storage mediums such as a flash memory and a hard disk can be adopted for the memory device of these configurations. The driving-mode switch control program for realizing the above-described driving-mode switch control method may be stored in any of the memory devices provided in the in-vehicle system.

Although the present disclosure has been described in accordance with the embodiments, it is understood that the present disclosure is not restricted to the embodiments and structures. The present disclosure encompasses various modifications and variations within an equivalent scope. In addition, various combinations and forms, as well as other combinations and forms including only one element, more than that, or less than that, are also within the scope and idea of the present disclosure.

What is claimed is:

1. A driving-mode switch control system comprising:
a manual driving device configured to perform manual driving of a vehicle in which a behavior of the vehicle is controlled based on a driving operation input by a driver into an operation device;
an automatic driving device configured to perform automatic driving of the vehicle on behalf of the driver;
an operation information acquisition unit configured to acquire, as operation amount information, an operation amount that is input by the driver into the operation device;
an arousal level determination unit configured to determine whether an arousal level of the driver is a level at which the manual driving is possible;
a switch determination unit configured to set an operation guide amount to be input into the operation device by the driver in response to the arousal level determination unit determining that the arousal level of the driver is at the level at which the manual driving is possible, and determine whether to permit a switching from the automatic driving to the manual driving based on a comparison between the operation amount acquired as the operation amount information by the operation information acquisition unit and the operation guide amount; and
an operation amount setting unit configured to store a characteristic of the driving operation for each driver in a period of the manual driving, and calculate an estimated operation amount that is estimated to be input by the driver on board during the manual driving on a road where the vehicle is traveling, based on the characteristic of the driving operation that is stored, wherein
the switch determination unit is configured to set the operation guide amount to be the estimated operation amount.

2. The driving-mode switch control system according to claim 1, further comprising:
an automatic driving limiting unit configured to temporarily limit a function of the automatic driving by the automatic driving device during a period for the comparison between the operation amount and the operation guide amount.

3. The driving-mode switch control system according to claim 2, further comprising:
a reaction force control unit, wherein
the operation device includes a reaction force generation mechanism that generates an operation reaction force against the driving operation by the driver, and
the reaction force control unit is configured to cause the reaction force generation mechanism to generate the operation reaction force in a direction to decrease the operation amount when the operation amount exceeds the operation guide amount or when the operation amount is predicted to exceed the operation guide amount during the period for the comparison between the operation amount and the operation guide amount.

4. The driving-mode switch control system according to claim 3, wherein the switch determination unit is configured to re-perform the comparison between the operation amount and the operation guide amount when the switch determination unit determines to reject the switching from the automatic driving to the manual driving, and during a period for a second or subsequent comparison between the operation amount and the operation guide amount, the reaction force control unit adjusts a magnitude of the operation reaction force so that the operation amount comes closer to the operation guide amount based on the driving operation by the driver in a period for a previous comparison.

5. The driving-mode switch control system according to claim 1, wherein
the switch determination unit is configured to re-perform the comparison between the operation amount and the operation guide amount when the switch determination unit determines to reject the switching from the automatic driving to the manual driving.

6. The driving-mode switch control system according to claim 1, further comprising:
an actuation control unit configured to actuate a driver awakening device to recover the arousal level of the driver when the arousal level determination unit determines that the arousal level of the driver is a level at which the manual driving is impossible.

7. The driving-mode switch control system according to claim 6, wherein
the switch determination unit is configured to determine whether to permit the switching from the automatic driving to the manual driving based on the comparison between the operation amount and the operation guide amount, with respect to the driver having the arousal level recovered to the level at which the manual driving is possible by an actuation of the driver awakening device.

8. The driving-mode switch control system according to claim 6, wherein
the switch determination unit is configured to permit the switching from the automatic driving to the manual driving without the comparison between the operation amount and the operation guide amount, with respect to the driver holding the arousal level at which the manual driving is possible even when the arousal level is not recovered by the driver awakening device.

9. The driving-mode switch control system according to claim 6, wherein
the actuation control unit is configured to continue an operation of the driver awakening device until the arousal level determination unit determines that the arousal level of the driver is the level at which the manual driving is possible.

10. The driving-mode switch control system according to claim 6, wherein
the actuation control unit is configured to use the driver awakening device to give a feeling of pressure to a skin of the driver or to move a skeleton of the driver to a predetermined appropriate position.

11. The driving-mode switch control system according to claim 1, wherein
the arousal level determination unit is configured to re-determine whether the arousal level of the driver is the level at which the manual driving is possible when the switching from the automatic driving to the manual driving is rejected by the switch determination unit.

12. The driving-mode switch control system according to claim 1, wherein
the switch determination unit is configured not to permit the switching from the automatic driving to the manual driving when a difference between the operation amount and the operation guide amount exceeds a permission threshold value.

13. The driving-mode switch control system according to claim 1, wherein
each of the operation information acquisition unit, the arousal level determination unit, the switch determination unit, and the operation amount setting unit is realized by a processor and a memory that stores a program executed by the processor, or an electric circuit.

14. A driving-mode switch control system comprising:
a manual driving device configured to perform a manual driving of a vehicle in which a behavior of the vehicle is controlled based on a driving operation input by a driver into an operation device;
an automatic driving device configured to perform an automatic driving of the vehicle on behalf of the driver;
an operation information acquisition unit configured to acquire, as operation amount information, an operation amount that is input by the driver into the operation device;
an arousal level determination unit configured to determine whether an arousal level of the driver is a level at which the manual driving is possible;
a switch determination unit configured to set an operation guide amount to be input into the operation device with respect to the driver determined by the arousal level determination unit to have the arousal level at which the manual driving is possible, and determine whether to permit a switching from the automatic driving to the manual driving based on a comparison between the operation amount acquired as the operation amount information and the operation guide amount;
an automatic driving limiting unit configured to temporarily limit a function of the automatic driving by the automatic driving device during a period for the comparison between the operation amount and the operation guide amount; and
a reaction force control unit;
wherein:
the operation device includes a reaction force generation mechanism that generates an operation reaction force against the driving operation by the driver, and
the reaction force control unit is configured to cause the reaction force generation mechanism to generate the operation reaction force in a direction to decrease the operation amount when the operation amount exceeds the operation guide amount or when the operation amount is predicted to exceed the operation guide amount during the period for the comparison between the operation amount and the operation guide amount,
the switch determination unit is configured to re-perform the comparison between the operation amount and the operation guide amount when the switch determination unit determines to reject the switching from the automatic driving to the manual driving, and
during a period for a second or subsequent comparison between the operation amount and the operation guide amount, the reaction force control unit adjusts a magnitude of the operation reaction force so that the operation amount comes closer to the operation guide amount based on the driving operation by the driver in a period for a previous comparison.

15. The driving-mode switch control system according to claim 14, wherein
each of the operation information acquisition unit, the arousal level determination unit, the switch determination unit, and the automatic driving limiting unit is realized by a processor and a memory that stores a program executed by the processor, or an electric circuit.

16. A driving-mode switch control program product stored in a non-transitory tangible storage medium for controlling a switching from an automatic driving to a manual driving of a vehicle mounted with a manual driving device that performs the manual driving of the vehicle in which a behavior of the vehicle is controlled based on a driving operation input by a driver into an operation device and an automatic driving device that performs the automatic driving of the vehicle on behalf of the driver, the driving-mode switch control program product causing a processor to:
determine whether an arousal level of the driver is a level at which the manual driving is possible;
acquire, as operation amount information, an operation amount that is input by the driver into the operation device;
store a characteristic of the driving operation for the driver in a period of the manual driving, and calculate an estimated operation amount that is estimated to be input by the driver during the manual driving on a road where the vehicle is traveling, based on the characteristic of the driving operation that is stored;
setting the estimated operation amount as an operation guide amount to be input into the operation device by the driver in response to determining that the arousal level of the driver is at the level at which the manual driving is possible; and determine whether to permit the switching from the automatic driving to the manual driving based on a comparison between the operation amount acquired as the operation amount information and the estimated operation amount set as the operation guide amount.

17. A driving-mode switch control program product stored in a non-transitory tangible storage medium for controlling a switching from an automatic driving to a manual driving of a vehicle mounted with a manual driving device that performs the manual driving of the vehicle in which a behavior of the vehicle is controlled based on a driving operation input by a driver into an operation device and an automatic driving device that performs the automatic driving of the vehicle on behalf of the driver, the operation device including a reaction force generation mechanism that generates an operation reaction force against the driving operation by the driver, the driving-mode switch control program product causing a processor to:

determine whether an arousal level of the driver is a level at which the manual driving is possible;

acquire, as operation amount information, an operation amount that is input by the driver into the operation device;

set an operation guide amount to be input into the operation device with respect to the driver determined to have the arousal level at which the manual driving is possible;

determine whether to permit the switching from the automatic driving to the manual driving based on a comparison between the operation amount acquired as the operation amount information and the operation guide amount;

temporarily limit a function of the automatic driving by the automatic driving device during a period for the comparison between the operation amount and the operation guide amount;

cause the reaction force generation mechanism to generate the operation reaction force in a direction to decrease the operation amount when the operation amount exceeds the operation guide amount or when the operation amount is predicted to exceed the operation guide amount during the period for the comparison between the operation amount and the operation guide amount;

re-perform the comparison between the operation amount and the operation guide amount when determining to reject the switching from the automatic driving to the manual driving; and adjust a magnitude of the operation reaction force so that the operation amount comes closer to the operation guide amount based on the driving operation by the driver in a period for a previous comparison, during a period for a second or subsequent comparison between the operation amount and the operation guide amount.

18. A driving-mode switch control method for controlling a switching from an automatic driving to a manual driving of a vehicle mounted with a manual driving device that performs the manual driving of the vehicle in which a behavior of the vehicle is controlled based on a driving operation input by a driver into an operation device and an automatic driving device that performs the automatic driving of the vehicle on behalf of the driver, the driving-mode switch control method comprising:

determining whether an arousal level of the driver is a level at which the manual driving is possible;

acquiring, as operation amount information, an operation amount that is input by the driver into the operation device;

storing a characteristic of the driving operation for the driver in a period of the manual driving, and calculating an estimated operation amount that is estimated to be input by the driver on a road where the vehicle is traveling during the manual driving, based on the characteristic of the driving operation that is stored;

setting the estimated operation amount as an operation guide amount to be input into the operation device by the driver in response to determining that the arousal level of the driver is at the level at which the manual driving is possible; and determining whether to permit the switching from the automatic driving to the manual driving based on a comparison between the operation amount acquired as the operation amount information and the estimated operation amount set as the operation guide amount.

19. A driving-mode switch control method for controlling a switching from an automatic driving to a manual driving of a vehicle mounted with a manual driving device that performs the manual driving of the vehicle in which a behavior of the vehicle is controlled based on a driving operation input by a driver into an operation device and an automatic driving device that performs the automatic driving of the vehicle on behalf of the driver, the operation device including a reaction force generation mechanism that generates an operation reaction force against the driving operation by the driver, the driving-mode switch control method comprising:

determining whether an arousal level of the driver is a level at which the manual driving is possible;

acquiring, as operation amount information, an operation amount that is input by the driver into the operation device;

setting an operation guide amount to be input into the operation device with respect to the driver determined to have the arousal level at which the manual driving is possible;

determining whether to permit the switching from the automatic driving to the manual driving based on a comparison between the operation amount acquired as the operation amount information and the operation guide amount;

temporarily limiting a function of the automatic driving by the automatic driving device during a period for the comparison between the operation amount and the operation guide amount;

causing the reaction force generation mechanism to generate the operation reaction force in a direction to decrease the operation amount when the operation amount exceeds the operation guide amount or when the operation amount is predicted to exceed the operation guide amount during the period for the comparison between the operation amount and the operation guide amount;

re-performing the comparison between the operation amount and the operation guide amount when determining to reject the switching from the automatic driving to the manual driving; and adjusting a magnitude of the operation reaction force so that the operation amount comes closer to the operation guide amount based on the driving operation by the driver in a period for a previous comparison, during a period for a second or subsequent comparison between the operation amount and the operation guide amount.

* * * * *